Q. L. SPARKS.
DEMOUNTABLE WHEEL RIM.
APPLICATION FILED MAY 29, 1915.
1,165,810.
Patented Dec. 28, 1915.
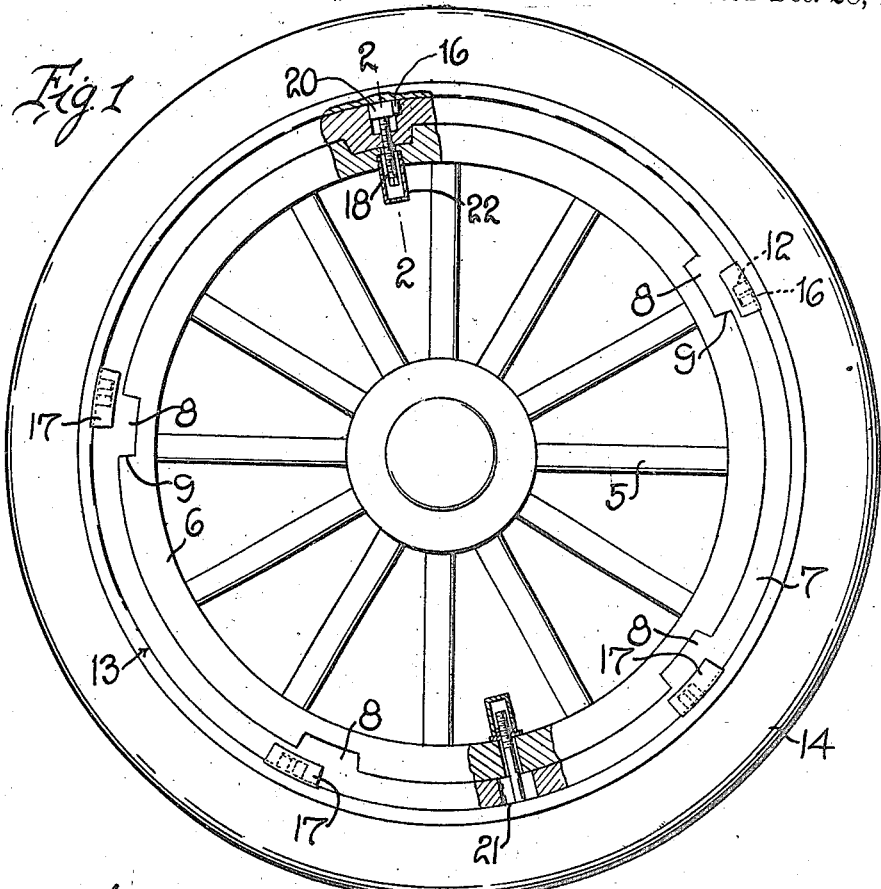
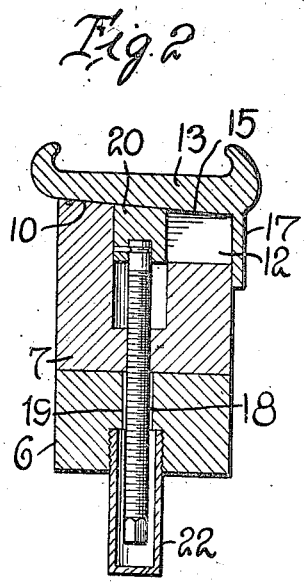
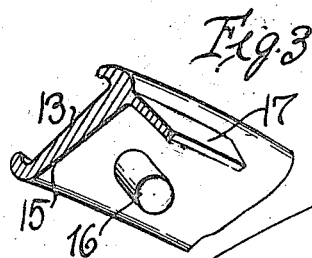
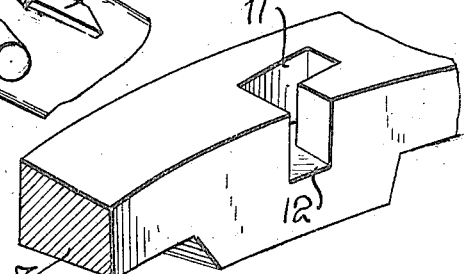
Inventor
Q. L. Sparks
By Watson E. Coleman
Attorney

UNITED STATES PATENT OFFICE.

QUINCE L. SPARKS, OF STAMPING GROUND, KENTUCKY.

DEMOUNTABLE WHEEL-RIM.

1,165,810.

Specification of Letters Patent.

Patented Dec. 28, 1915.

Application filed May 29, 1915. Serial No. 31,192.

*To all whom it may concern:*

Be it known that I, QUINCE L. SPARKS, a citizen of the United States, residing at Stamping Ground, in the county of Scott and State of Kentucky, have invented certain new and useful Improvements in Demountable Wheel-Rims, of which the following is a specification, reference being had to the accompanying drawings.

This invention relates to an improved demountable wheel rim and has for its primary object to provide means for easily and quickly mounting the rim and tire upon the felly band of the wheel without necessitating the provision of clamps or analogous securing means or requiring a sectional construction of the rim.

The invention has for a more particular object to provide a continuous demountable rim provided with spaced inwardly projecting studs, a felly band having peripheral seats for said studs, and means adjustable in the felly band to lock the studs within said seats and retain the rim in a fixed position upon the band.

It is a further general object of my invention to provide a demountable wheel rim particularly designed for use upon motor vehicle wheels, which is simple in its construction, light in weight and highly serviceable and convenient in practical use.

With the above and other objects in view, my invention consists in the novel features of construction, combination, and arrangement of parts to be hereinafter more fully described, claimed, and illustrated in the accompanying drawing, in which, Figure 1 is a side elevation, certain parts being broken away, illustrating the preferred embodiment of my improved demountable rim; Fig. 2 is an enlarged section taken on the line 2—2 of Fig. 1; and Figs. 3 and 4 are detail perspective views of fragments of the rim and felly band, respectively.

Referring in detail to the drawing, 5 designates the wheel having the usual felly 6 connecting the outer ends of the wheel spokes. The metal felly band 7 is provided at spaced points with inwardly projecting lugs 8 to seat in the notches or recesses 9 of the felly. The felly band 7 is provided with a transversely inclined outer peripheral face shown at 10, and in the periphery of the felly band, at spaced points, the short circumferentially extending grooves or recesses 11 are formed, said recesses being angularly extended at one of their ends and opening upon the outer face of the felly band, as indicated at 12. Thus, it will be seen that the felly band is provided with, what is in effect, spaced bayonet slots in its periphery.

The demountable rim, indicated generally by the numeral 13, may be provided with the clenching flanges or other suitable means to retain the tire, indicated at 14, thereon. This rim has its inner face transversely inclined, as at 15, for sliding frictional engagement upon the correspondingly inclined peripheral face of the felly band 7. The rim 13 carries spaced inwardly extending radially disposed cylindrical studs 16 which are adapted to be received in the bayonet slots or grooves formed in the periphery of the band 7. Adjacent to each of these studs 16, the rim 13 has integrally formed upon its outer face the inwardly projecting ears or lugs 17.

A set screw 18 is threaded in the metal felly band, the shank of said set screw extending loosely through an opening 19 in the wood felly of the wheel. The outer end of the set screw is swiveled in a rectangular block 20 which is loosely mounted in the angular end of one of the bayonet slots or grooves in the periphery of the felly band. The felly 6 of the wheel, at a point opposite to this set screw, is also provided with an opening which coincides with an elongated opening 21 in the metal felly band and is designed to receive the inflating tube of the wheel tire. This tube is inclosed within a suitable dust cap, and over the inner end of the set screw 18, a cap of similar form, indicated at 22, is preferably disposed.

In mounting the rim 13 upon the wheel, said rim is fitted over the metal felly band and shifted transversely thereon, the studs 16 entering the angular ends 12 of the bayonet slots in the felly band. The rim is then shifted circumferentially so that the studs will enter the longitudinal portions of the bayonet slots, the lugs 17 on the rim moving over the ends of the bayonet slots and closing the same to effectually exclude dust and dirt therefrom. The set screw 18 is now turned so as to force the head 20 thereon outwardly and engage the same against the inner face of the rim 13. This head being now disposed in line with the stud 16 which is engaged in the slot of the felly band, will effectually prevent any circumferential shifting movement of the rim which would permit of the movement of the studs out of the respective slots in the felly band. In this manner, the rim and wheel tire are securely locked and held in a fixed position upon the wheel.

From the foregoing description, taken in connection with the accompanying drawing, the construction and manner of use of my improved demountable rim will be clearly understood. The rim and tire may be very easily and quickly secured upon the wheel or readily removed therefrom without necessitating the use of any tools whatsoever. While a single one of the locking blocks 19 is sufficient to lock the rim in its applied position, it will, nevertheless, be understood that, if desired, one of these adjustable blocks may be provided for each of the inwardly projecting studs carried by the rim. The felly band and demountable rim may be of any desired cross-sectional form, as may be advisable in view of the particular type of vehicle wheel upon which the same is to be employed. My invention is also susceptible of a great many other modifications in the form, proportion and arrangement of the several elements thereof and it will, therefore, be understood that I reserve the privilege of resorting to all such legitimate changes as may be fairly embodied within the spirit and scope of the invention as claimed.

Having thus fully described my invention, what I desire to claim and secure by Letters Patent is:—

The combination with a vehicle wheel having a metal felly band provided in its periphery with spaced bayonet slots opening upon one of the side faces of said band, said felly band being further provided with a transversely inclined outer peripheral face, of a demountable rim inclined for sliding frictional engagement upon the face of the felly band, inwardly projecting studs on the rim for engagement in the respective bayonet slots and provided upon one of its side faces with inwardly extending lugs adjacent to the respective studs, a set screw threaded in the felly band for radial adjustment therein, and a block swiveled upon the outer end of said screw adapted to lock the rim against circumferential movement upon the band or permit of its removal therefrom, said lugs on the rim closing the angular ends of the slots when the rim is locked in position upon the band.

In testimony whereof I hereunto affix my signature in the presence of two witnesses.

QUINCE L. SPARKS.

Witnesses:
 W. HAMBRICK,
 R. H. ANDERSON.

Copies of this patent may be obtained for five cents each, by addressing the "Commissioner of Patents, Washington, D. C."